(No Model.)
I. W. ADAMS.
STRAW ELEVATOR.
No. 374,723. Patented Dec. 13, 1887.
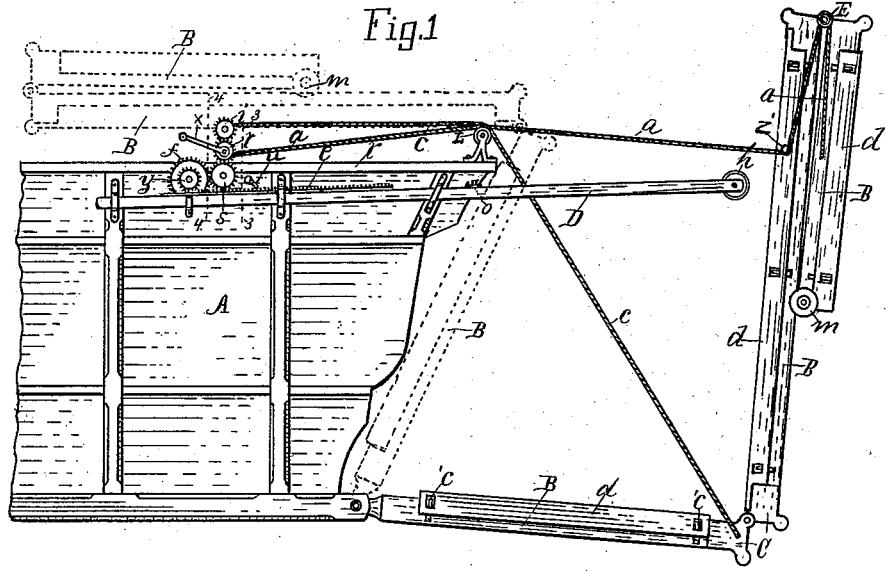
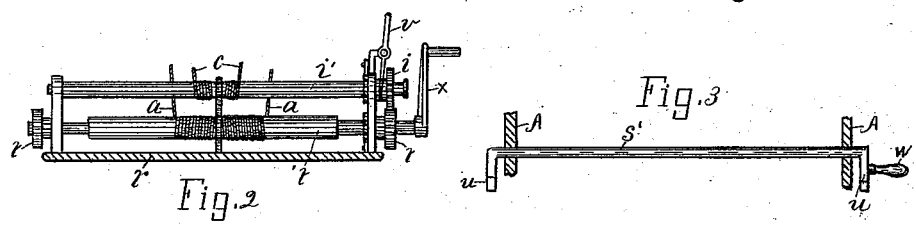
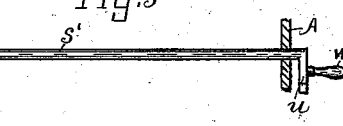
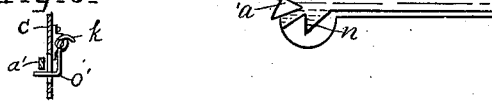
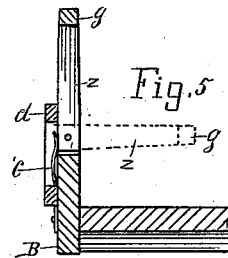
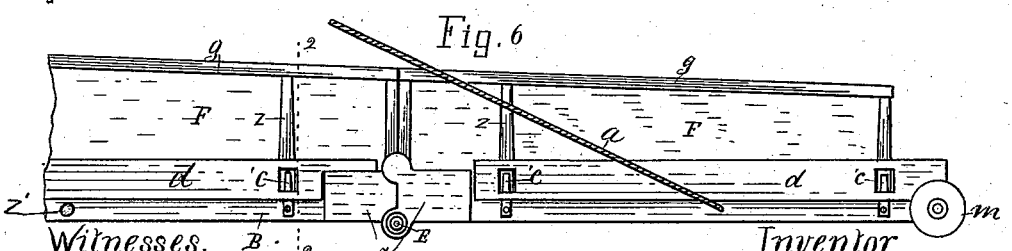
Witnesses,
John C. Perkins
Henry S. M. Howard
Inventor
Isaac W. Adams
By Lucius C. West
Atty.
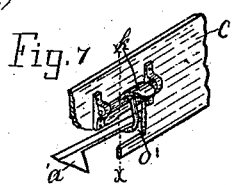
N. PETERS, Photo-Lithographer, Washington, D. C.

UNITED STATES PATENT OFFICE.

ISAAC W. ADAMS, OF WEST LE ROY, MICHIGAN.

STRAW-ELEVATOR.

SPECIFICATION forming part of Letters Patent No. 374,723, dated December 13, 1887.

Application filed March 26, 1887. Serial No. 232,528. (No model.)

*To all whom it may concern:*

Be it known that I, ISAAC W. ADAMS, a citizen of the United States, residing at West Le Roy, county of Calhoun, State of Michigan, have invented a new and useful Improvement in Thrashing-Machine Straw-Elevators, of which the following is a specification.

This invention relates to folding straw-elevators of thrashing-machines, and it has for its object certain improvements, substantially as below described and claimed.

In the drawings forming a part of this specification, Figure 1 is a side elevation; Fig. 2, a cross-section on the dotted line 4 4 in Fig. 1, looking from a point at the left hand; Fig. 3, a section of parts on dotted line 3 3 in Fig. 1, looking from a point at the left hand; Fig. 4, an enlarged view of details below described; Fig. 5, a section on line 2 2 in Fig. 6, enlarged; Fig. 6, enlarged lettered details from Fig. 1; and Fig. 7 are broken lettered details from Fig. 4, showing opposite side in perspective. Fig. 8 is a section on dotted line $x\ x$ in Fig. 7, showing lettered details below described.

Referring to the lettered parts of the drawings, A represents the rear end of a thrashing-machine where the straw comes out onto the straw-elevator. The folding elevator here shown is made in three hinged sections, B, but of course more sections or less might be employed by proper arrangement therefor. This folding elevator is hinged to the rear of the thrashing-machine, Fig. 1, in the ordinary manner.

Two windlasses, $t'$ and $i'$, one above the other, are mounted on top of the machine above the upper inclosure, $r$, in suitable end bearings, Fig. 2. The lower windlass, $t'$, has a pinion, $t$, at each end, and with a crank, $x$, at one or both ends, as desired, or the crank may be detachable and attached to either end at will. The upper windlass has a sliding pinion, $i$, operated by a pivoted lever, $v$, as in Fig. 2. The pinion $i$ meshes with the pinion $t$ at the right end of the lower windlass, $t'$.

On the side of the machine-frame below and meshing with the pinion $t$ is a pinion, $s$, and the pinion $s$ in turn meshes with a pinion, $f$, in front of it. $y$ is a smaller pinion keyed to the same shaft to which pinion $f$ is attached. These two pinions or gears, $f$ and $y$, may be integral with each other. Like gears $y$, $f$, and $s$ are on the opposite side of the machine.

At D is shown a horizontally-sliding rack-bar with rack $e$, having loop-supports on the side of the machine-frame, Fig. 1. The rack $e$ of this bar meshes with the pinion $y$. A like bar is on the other side of the machine, only one side being herein shown. The bar D is provided with a short rack, $o$, a little removed from the rack $e$.

At the rear of pinion $s$ is a transverse rocking shaft, $s'$, extending across and beyond each side of the machine-frame, Fig. 3. This shaft is provided at the ends with right-angled projections, $u\ u$. One or both of these projections $u$ is or are provided with a handle, $w$, the use of which is explained in the description of the operation. A rope, $c$, is attached to the first section of the elevator and winds on the upper windlass, $i'$. A rope, $a$, is attached to the last section, is caught over a projection, E, on the hinge C, and over stud $z'$, and winds on the lower windlass, $t$. These ropes are duplicated on the other side of the machine and elevator. (See Fig. 2.)

In the operation of lowering and folding the elevator, referring to Fig. 1, the elevator is shown folded onto the machine A by dotted lines of the parts or sections B. When thus folded, the rack-bars D are forward, so that the space between the racks $e$ and $o$ is beneath the pinions $y$, and the racks $o$ are beneath the projections $u$ of the rocking shaft $s'$. This brings the rollers $h$ of the rack-bars D just at the rear end of the machine A. This position of the rack-bar is not shown; but it will be understood by the description of the operation. With the pinion $i$ in mesh with the pinion $t$, the crank $x$ is now turned, allowing the ropes to unwind until the first section is at approximately a horizontal position, or at an incline below a horizontal position, as in Fig. 1, unless blocks were set in the rear of the machine for the carrier to rest on. At this time the next sections would lean on the roller L at the top end of the machine at about the angle of the inclined part of the rope $c$ in Fig. 1. The rope $c$ is now all unwound.

The next step is to throw the pinion $i$ out of mesh with the pinion $t$, by means of lever $v$, Fig. 2, and rock the shaft $s'$ by means of handle w, causing the projections u to engage the racks o and slide the rack-bars D a little to the rearward to bring the racks e in mesh with the pinion y. The crank x is now turned, which action unwinds the ropes a from the windlass t, and forces the rack-bars D rearwardly. The rollers h, coming in contact with the sections, swing them rearwardly until they pass a perpendicular, when they will swing down by gravity as fast as the unwinding ropes a will permit. The position in Fig. 1 illustrates the position of parts at this stage of the operation, the sections having just swung away from the rollers h. As the sections continue to fall, the rear short section will assume a perpendicular position, and when the roller m at the end comes in contact with the ground said end will slide rearwardly on the ground until the elevator is entirely down in an unfolded condition. Should the roller end of the rear section, by contact with the ground, fail to move rearwardly, it can be started back by hand.

As the operation of folding is a reverse of unfolding, the position of the sections in Fig. 1 will serve to illustrate said operation. With the gears i t out of mesh the crank x is turned in the other direction. When the rear sections reach a perpendicular position, they being in contact with the rollers h of the rack-bars D, this forces said bars forward, causing the racks e to again mesh with pinion y, and the crank is turned until the swinging rising sections again rest over against roller L. During this action the rack-bars are slid back, and as their racks e mesh with the pinion y the sections only move as fast as the rope a is wound up on windlass t'. The pinions i t are now thrown in mesh and the crank x turned until the sections are raised and mounted, as in dotted position in Fig. 1.

At F, Fig. 6, are shown cloth curtains attached to the frame z g. These frames are hinged in the top of the side walls of the elevator-sections, Fig. 5. The side boards, d, extend above the side walls, and are attached to the outside of said walls. Springs c' are attached to the side walls and play in slots in the side boards, d. The upper edges of these boards d prevent the frame z g from swinging over too far outward when raised, as in Fig. 5. The contact of the springs c' with the outside of the hinged standards z of the frame z g hold said frames from tilting down, as in dotted position in Fig. 5, but allow them to be so tilted by design when the elevator is not in use. When in the dotted position, the contact of the springs c' with the blunt lower (then outer) end of the standards holds the frames from misplacement, except by design to raise them. The said lower end of part z may be cut slanting, so that when the curtains are folded into the sections the upper side, g, will rest on the floor of the sections B.

In Figs. 4 and 7 is shown a lock-hinge for hinging the sections B together. C C are two plates hinged at the corner of their contiguous ends. At the other corner of one plate is a notch, n, and at the other corner of the other plate is a spring-catch, a', adapted to snap into the notch n, when two hinged sections B are in the same plane, and thus hold them locked until they are by design unlocked. The catch a' is raised to unlock by means of a pivoted thumb-lever, k, on the outside of said plates, its lower end, as in Fig. 7, extending through slot o' in plate C. The end of the thumb-lever which extends through the slot o' passes beneath the spring-catch a', and when the thumb-lever k is borne down the said right-angled end bears upon the catch a' and raises it, and thus unlocks the hinge. This angled end 3 of the lever k, which extends through the slot of plate C and beneath the catch a', is more clearly shown in the sectional view, Fig. 8.

So far as the means for folding and unfolding the sections are concerned, any style of hinge may be employed to hinge said sections together which are suitable for the purpose.

Having thus described the invention, what I claim, and desire to secure by Letters Patent, is—

1. A thrashing-machine and the hinged elevator-sections, in combination with the sliding bars provided with the separated racks, the lower windlass-gear connected with the pinions which mesh with the racks, the upper windlass having the adjustable pinion adapted to mesh with the pinion at one end of the lower windlass, the ropes adapted to wind on said windlasses and attached to the hinged sections, and the rocking shaft having the end projections adapted to engage the short rack, substantially as set forth.

2. In combination, the elevator-sections, the end plates hinged together, one plate having the notch and the other the spring-catch, and the pivoted thumb-lever having the right-angled end passed through a slot in the plate beneath the spring-catch, substantially as set forth.

3. An elevator-section having the upwardly-extended recessed side boards, the springs in said recesses, and the curtains and frames, the vertical standards of said frames being hinged to the side walls of the section in position to contact the yielding springs, for the objects stated, all combined substantially as set forth.

In testimony of the foregoing I have hereunto subscribed my name in presence of two witnesses.

ISAAC W. ADAMS.

Witnesses:
 CHARLES A. BARBER,
 NELSON E. HUBBARD.